May 20, 1930.　　　H. S. GRAVES　　　1,759,109

PISTON AND CONNECTING ROD ASSEMBLY

Filed Aug. 10, 1927

Inventor
Harry S. Graves,
By
Attorneys

Patented May 20, 1930

1,759,109

UNITED STATES PATENT OFFICE

HARRY S. GRAVES, OF HIGHLAND PARK, MICHIGAN; ETHEL S. GRAVES ADMINISTRATRIX OF SAID HARRY S. GRAVES, DECEASED

PISTON AND CONNECTING-ROD ASSEMBLY

Application filed August 10, 1927. Serial No. 211,899.

The present invention pertains to a novel assembly of a piston to its connecting rod in the nature of a universal joint.

The principal object of the invention is to provide an assembly of this kind wherein there will be no binding or wear at the joint between the connecting rod and the piston during the running of the piston. The connection is made in the form of a universal joint which permits side play of the connecting rod so that there will be no binding or wear even if the piston runs somewhat irregularly.

In the practical construction according to the invention, there is provided in the piston a diametrical sleeve formed either as an integral part or as a separate member inserted in the piston bearings. A socket member having a spherical socket and consisting of two split parts is fitted into the sleeve in such a manner as to receive a ball formed on the end of the connecting rod. Suitable locking devices are applied to the ends of the socket member for preventing shifting thereof either rotatably or laterally in the sleeve.

The invention is fully disclosed by way of example in the following description and in the accompanying drawings, in which Figure 1 is a longitudinal section of a piston having a connecting rod joined thereto according to the invention;

Reference to these views will now be made by use of like characters which are employed to designate corresponding parts throughout.

Figure 1:
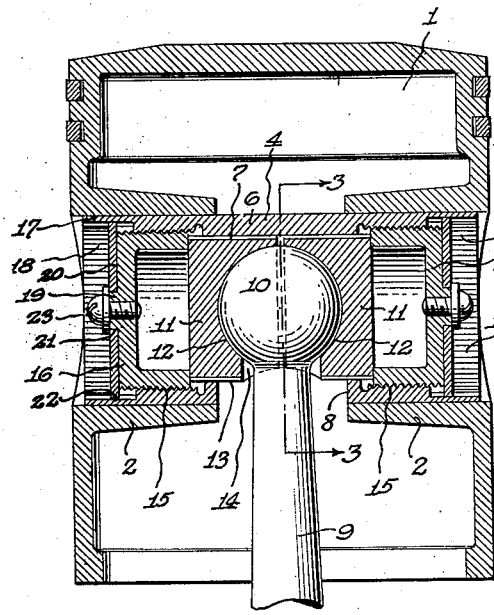

In Fig. 1 is shown a piston 1 having in general the usual construction and equipped with diametrically opposed bearings 2 which ordinarily accommodate the wrist pin. In the present instance, however, no wrist pin is used, and I employ a sleeve 4 having its ends fitted firmly into the bearings.

Figures 2, 3:
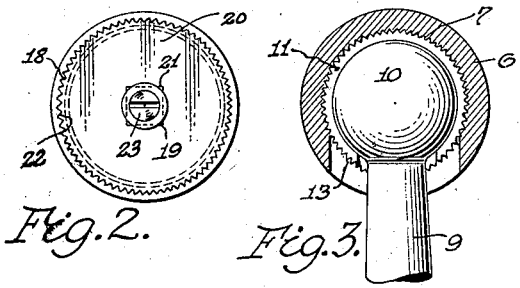
Fig. 2 is a detail end view of the connecting rod assembly.
Fig. 3 is a section on the line III—III of Fig. 1.

The center part 6 of the sleeve is of a smaller internal diameter than the remainder and is formed with longitudinal serrations 7. The lower part of this thicker portion, with respect to the cylinder head, is cut away at 8 for the purpose which will presently appear The connecting rod 9 extending upwardly to a point between the bearings 2 is provided with a spherical head 10 which may be passed between the bearings through the space 8. Into the center serrated part of the sleeve 4 is fitted a socket member consisting of two split sections 11 each having a substantially semi-pherical recess 12 of such size as to permit turning of the head 10 therein without looseness. The outer cylindrical surfaces of these members are longitudinally serrated as at 13 for interlocking with the serrations 7 as shown in Fig. 3. The lower part of each socket section is also cut away at 14 to permit play of the upper part of the piston rod 9 therein in turning about the head 10 as a center. The inner wall of the sleeve 4 is threaded at 15 at each end of the thicker center part 6 for receiving caps 16 bearing against the ends of the socket member. The sleeve 4 is thinned at 17 outwardly of the threads 15, and the thinned portion is again serrated longitudinally as indicated by numeral 18. Each cap is formed at its outer end with a square stud 19 surrounded by a washer 20 having a square central opening 21 for receiving the stud. As a result of this arrangement, the caps 16 are prevented from turning relatively to the washers. The periphery of the washers is toothed or serrated at 22 for interlocking with the serrations 18 at the end of the sleeve 4. Finally, the washers are secured to the caps by screws 23 threaded into the studs 19.

The socket member is prevented from turning within the sleeve 4 because of the serrations on these parts as already described. The caps 16 which are threaded against the ends of the socket member prevent the latter from sliding provided that the caps themselves are prevented from threading out of the sleeve. The latter function is accomplished by the washers 20, since the caps cannot turn relatively to the washers as already explained, and the washers cannot turn because of their anchorage in the sleeve ends by the serrations 18 and 22.

Figure 4:
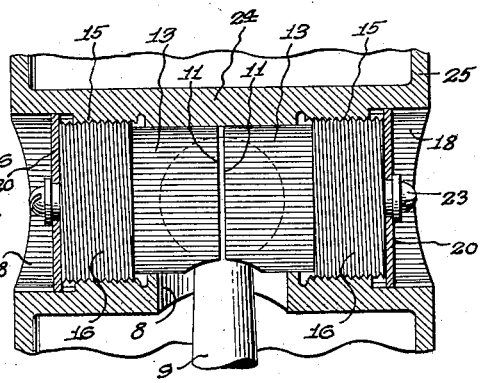
Fig. 4 is a detail longitudinal section of a modification.

In the embodiment shown in Fig. 4, the sleeve 24 is formed as an integral part of the piston 25. This construction is preferable when the mode of assembly according to this invention is contemplated at the time that the piston is being made, while the construction described in connection with Figs. 1, 2 and 3 is suitable for pistons already made in view of the conventional modes of assembly. With reference again to Fig. 4, the socket member and the retaining means therefor are similar to those shown in Figs. 1, 2 and 3.

Figure 5:
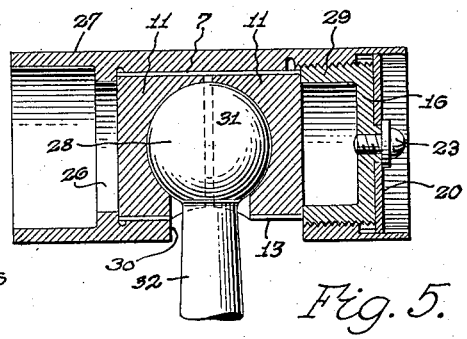
Fig. 5 is a similar section of still another modification.
Figure 6:
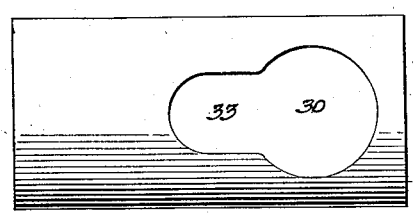
Fig. 6 is a bottom plan view of the sleeve shown in Fig. 5.

Figs. 5 and 6 illustrate a construction wherein one of the end locking assemblies is replaced by an internal rib 26 formed on the inner wall of the sleeve 27. The socket member 28 has one end abutting the rib, while the other end thereof is retained by a locking unit 29 of the form already described. The lower part of the sleeve 27 is formed with a circular opening 30 through which the head 31 of the connecting rod 32 may be passed into the sleeve. The opening 30 communicates with a slot 33 of less width wherein the connecting rod may be shifted as required during the assembly of parts.

Figure 7:
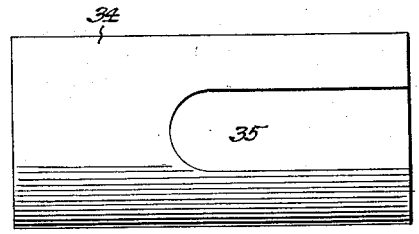
Fig. 7 is a bottom plan view of a modified sleeve.

In Fig. 7 is shown a modified type of sleeve which may be used in the form of construction illustrated in Fig. 5. The sleeve 34 in Fig. 7 has a slot 35 extending from the center thereof through one end of the sleeve. This slot is narrower than the diameter of the spherical head of the connecting rod, and the latter is inserted in the sleeve by being placed directly in line with the sleeve while the shank or rod is slid along the slot 35, whereby the head enters the sleeve directly through an end.

It will be apparent that any of the foregoing devices is capable of accomplishing the objects which have already been indicated and that the invention is applicable to pistons of the conventional type as well as those constructed especially for assembly by the means disclosed herein.

Although specific embodiments of the invention have been illustrated and described, it will be understood that various alterations in the details of construction may be made within the scope of the invention as indicated by the appended claims.

What I claim is:—

1. In a piston, a sleeve supported transversely therein, a socket member inserted in said sleeve, and means for retaining said member against sliding in said sleeve.

2. In a piston, a sleeve supported transversely therein, a socket member inserted in said sleeve, and means for retaining said member against turning and sliding in said sleeve.

3. In a piston, a sleeve supported transversely therein, a socket member inserted in said sleeve, and caps threaded in said sleeve and engaging the ends of said socket member.

4. In a piston, a sleeve supported transversely therein, a socket member inserted in said sleeve, said member having a toothed engagement with said sleeve to prevent turning thereof and locking elements engaging the ends of said socket member to prevent sliding thereof.

5. In a piston, a sleeve supported transversely therein, a socket member inserted in said sleeve, said member having a toothed engagement with said sleeve to prevent turning thereof, and caps threaded in said sleeve and engaging the ends of said member to prevent sliding thereof.

6. In a piston, a sleeve supported transversely therein, a socket member inserted in said sleeve, said member having a toothed engagement with said sleeve to prevent turning thereof, and caps threaded in said sleeve and engaging the ends of said member to prevent sliding thereof, washers secured to said caps, said washers having a toothed engagement with said sleeve to prevent turning thereof.

7. In a structure of the class described in combination, a piston head provided with internal spaced bushings, a hollow piston pin secured in said bushing, sectional socket means in said pin, and a connecting rod having a ball connector disposed between said sections.

In testimony whereof I affix my signature.

HARRY S. GRAVES.